United States Patent [19]
Borger et al.

[11] 3,973,990
[45] Aug. 10, 1976

[54] GALVANIC CELL WITH SOLID FLUORIDE ION-CONDUCTIVE ELECTROLYTE

[75] Inventors: Waldemar Borger, Kelkheim, Taunus; Udo Hullmeine, Hofheim-Dbn; Ernst Voss, Liederbach, all of Germany

[73] Assignee: Varta Batterie Aktiengesellschaft, Kelkheim, Taunus, Germany

[22] Filed: Jan. 13, 1975

[21] Appl. No.: 540,682

[30] Foreign Application Priority Data
May 25, 1974 Germany............................ 2425367
Jan. 12, 1974 Germany............................ 2401497

[52] U.S. Cl. .............................. 136/6 L; 136/83 R; 136/153
[51] Int. Cl.² ........................................ H01M 10/00
[58] Field of Search ................. 136/6LN, 83 R, 6 L, 136/153, 155, 83 T

[56] References Cited
UNITED STATES PATENTS
3,318,734   5/1967   McCully ........................ 136/153 X Primary Examiner—John H. Mack
Assistant Examiner—C. F. LeFevour
Attorney, Agent, or Firm—Herbert L. Lerner

[57] ABSTRACT

In a galvanic cell, there is provided a solid fluoride ion-conductive electrolyte which is a compound having the formula $M_nPb_{1-n}F_{2-n}$ wherein M is at least one element selected from the group consisting of potassium and rubidium; Pb is usually all lead but part of the lead may be replaced by metal more electropositive than lead; F is fluorine; and n is a positive value.

9 Claims, 3 Drawing Figures

GALVANIC CELL WITH SOLID FLUORIDE ION-CONDUCTIVE ELECTROLYTE

The invention relates to a galvanic element or cell, and especially to such a cell having a solid fluoride ion-conductive electrolyte and solid electrodes at operating temperature.

A galvanic cell with solid fluoride ion-conductive electrolyte is known. The solid electrolyte is formed of calcium fluoride doped with sodium fluoride; the positive electrode is formed of fluorides of chromium, manganese, iron, cobalt, nickel, copper, zinc, silver or cadmium, and the negative electrode of metallic calcium, magnesium or beryllium. Such a cell possesses the advantage of a high ratio of available electrical energy to weight, but has the disadvantage, however, that the conductivity of the solid electrolyte is not optimal in the temperature range between room temperature and about 400°C which is of particular interest. Due to this reason, especially, the solid electrolyte must be used in the form of exceptionally thin layers having a thickness of $10\mu$ for example, and the production of such thin layers is costly.

A thermally regenerative galvanic element or member having electrodes formed of arsenic fluorides, cerium fluorides or uranium fluorides have been known heretofore. The above complies with MPEP 608.01(r). As further disclosed in this patent, $PbF_2$ constitutes the solid fluorine ion-conductive electrolyte. Small additions of potassium fluoride to the electrolyte increase the conductivity thereof. A disadvantage of the galvanic cell described in the aforementioned patent is that the electrode materials are liquid or gaseous at the operating temperatures. In addition, arsenic fluorides are extremely toxic substances, which makes their use as highly volatile electrode materials very difficult. Furthermore, the cell voltages of the major part of the cells described in the aforementioned U.S. patent are very low.

It is accordingly an object of the invention to provide a solid electrolyte of relatively high conductivity which has a high conductivity in the temperature range between room temperature and about 300°C and, with this solid electrolyte, to construct a galvanic cell which possesses high energy density and is storable for a lengthy period.

With the foregoing and other objects in view, there is provided in accordance with the invention, in a galvanic cell, a solid fluoride ion-conductive electrolyte which is a compound having the formula $M_nPb_{1-n}F_{2-n}$ wherein M is at least one element selected from the group consisting of potassium and rubidium; Pb is a substance, usually lead, but may also be part lead and part metal more electropositive than lead; F is fluorine and n is a positive value.

In accordance with a further feature of the invention, there is provided, in a galvanic cell, a solid fluoride ion-conductive electrolyte which is a compound having the formula $(PbF_2)_{1-n}(MF)_n$ wherein Pb is usually lead but may also be part lead and part metal more electropositive than lead; F is fluorine; n is a value between 0.001 and 0.1, preferably between 0.004 and 0.04; and M is at least one element selected from the group consisting of potassium and rubidium.

The n-value in the foregoing first-mentioned compound is greatly temperature-dependent and can, in fact, assume a value of 0.1 to 0.6 depending upon the temperature and the selected M cation.

Other features which are considered as characteristic for the invention are set forth in the appended claims.

Although the invention is illustrated and described herein as embodied in a galvanic cell with solid fluoride ion-conductive electrolyte, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
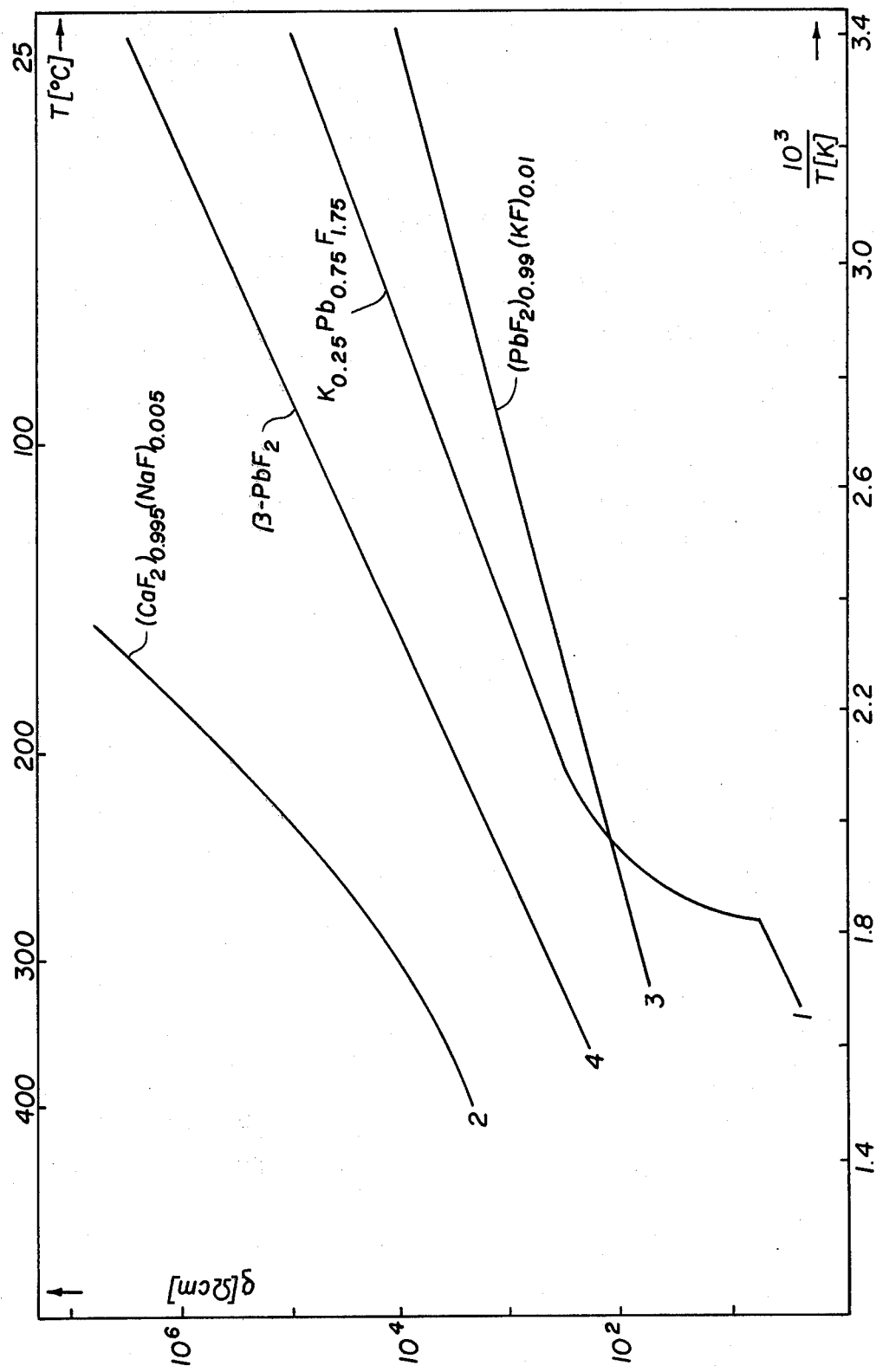
FIG. 1 is a plot diagram of specific resistance of different electrolytes according to the invention as a function of temperature.

In FIG. 1, the specific resistance of the compound $K_{0.25}Pb_{0.75}F_{1.75}$ (curve 1) is shown against or as a function of the temperature and is compared with specific resistance values obtained for calcium fluoride doped with sodium fluoride (curve 2). (See R. W. Ure, J. Chem. Phys. 26, 1363 (1957)). From this comparison, it is evident that the conductivity of $K_{0.25}Pb_{0.75}F_{1.75}$ is higher than that of the doped calcium fluoride, especially at temperatures of 260° to 280°C whereat a phase change occurs.

Instead of all lead in the electrolyte compound of the invention, part of the lead is replaceable by a metal more electropositive than lead such as, for example, earth alkali metals like calcium, barium and strontium or heavy metals like zinc and bismuth. Of the foregoing replacement metals, barium or zinc are preferred. It is thereby possible, within given limits, to increase the decomposition voltage.

Good results were attained with the use of up to 30 mol. % zinc instead of lead; on principle, it is also possible to use higher fractions, such as about 60 mol. % of the electropositive metal, for example.

In accordance with another feature of the invention, heavy metal fluorides of the heavy metals copper, nickel, cadmium and lead as well as carbon fluorides and complex fluorides such as $K_2PbF_6$, $K_2NiF_6$ and $K_2MnF_6$ are suited for the positive electrode employed in connection with the foregoing solid electrolyte of the invention.

In accordance with a further feature of the invention, the negative electrode of the galvanic cell of the invention is formed of earth-alkali and alkali metals. Heavy metals such as zinc, lead and cadmium, or compounds of lead with earth alkali and/or alkali metals, such as potassium lead alloys (0.25 mol. potassium; 0.75 mol. lead), for example, can also be used for the negative electrode. Preferred materials of the negative electrode are lead, in spite of the relatively low theoretical cell voltage, as well as magnesium and zinc.

Figure 2:
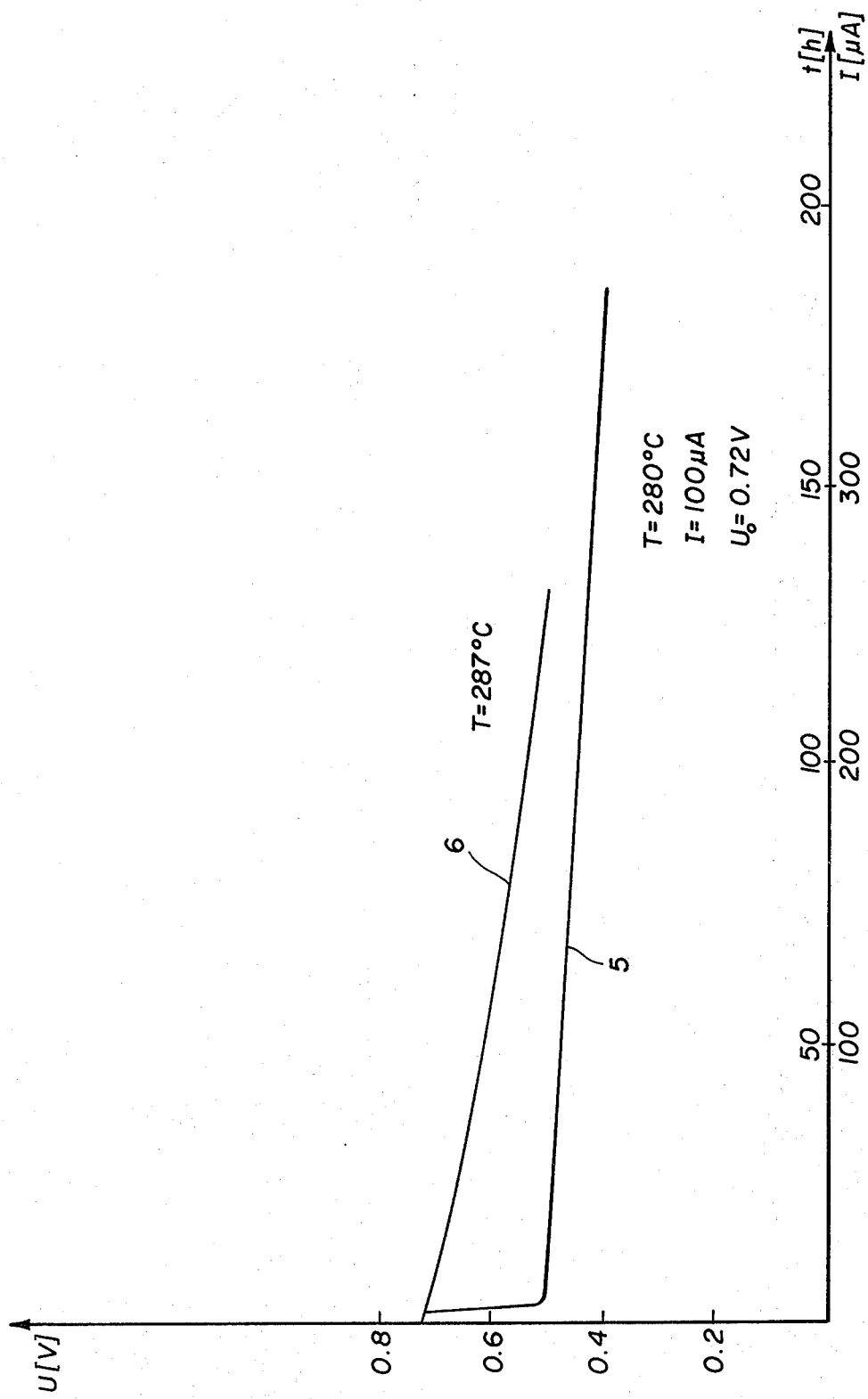
FIG. 2 are plot diagrams of voltage as a function of time and current, respectively, for a particular galvanic cell constructed in accordance with the invention.

Tests with a cell formed of a negative lead electrode, a solid electrolyte having the composition $K_{0.25}Pb_{0.75}F_{1.75}$ and a positive carbon fluoride $(CF)_x$ electrode have produced the voltage-time curve (curve 5) and the load diagram or voltage-current curve (curve 6), base shown in FIG. 2. The cell has an open circuit voltage of 0.72 v. When discharging with 0.1 mA at 280°C, a cell voltage of 0.5 v is observed. Under this load, the cell discharges in 150 hours. The construction of these cells is a conventional stratified or layered construction wherein the thickness of the solid electrolyte is about 2 mm. In the hereinafter presented table, there is given, a number of additional possible types of cells with negative lead or magnesium electrodes and various positive electrodes, as well as the theoretical cell voltage thereof.

| Cell Type | Reaction | Theoretical Cell Voltage(v) |
|---|---|---|
| Pb/$M_nPb_{1-n}F_{2-n}$/PbF$_4$ | Pb + PbF$_4$ = 2PbF$_2$ | 2.13 |
| Pb/$M_nPb_{1-n}F_{2-n}$/CuF$_2$ | Pb + CuF$_2$ = PbF$_2$ + Cu | 0.68 |
| Mg/$M_nPb_{1-n}F_{2-n}$/(CF)$_x$ | Mg + 2CF = MgF$_2$ + C | 4.04 |
| Mg/$M_nPb_{1-n}F_{2-n}$/CuF$_2$ | Mg + CuF$_2$ = MgF$_2$ + Cu | 2.92 |

Also shown in FIG. 1 are the temperature-dependence of the specific resistance of $(PbF_2)_{0.099}(KF)_{0.01}$ on curve 3 as well as of the specific resistance of $\beta$-PbF$_2$ on curve 4. Doping with only 1 mol. % potassium fluoride results in a considerable increase of conductivity within the full temperature range of 25° to 300°C.

Figure 3:
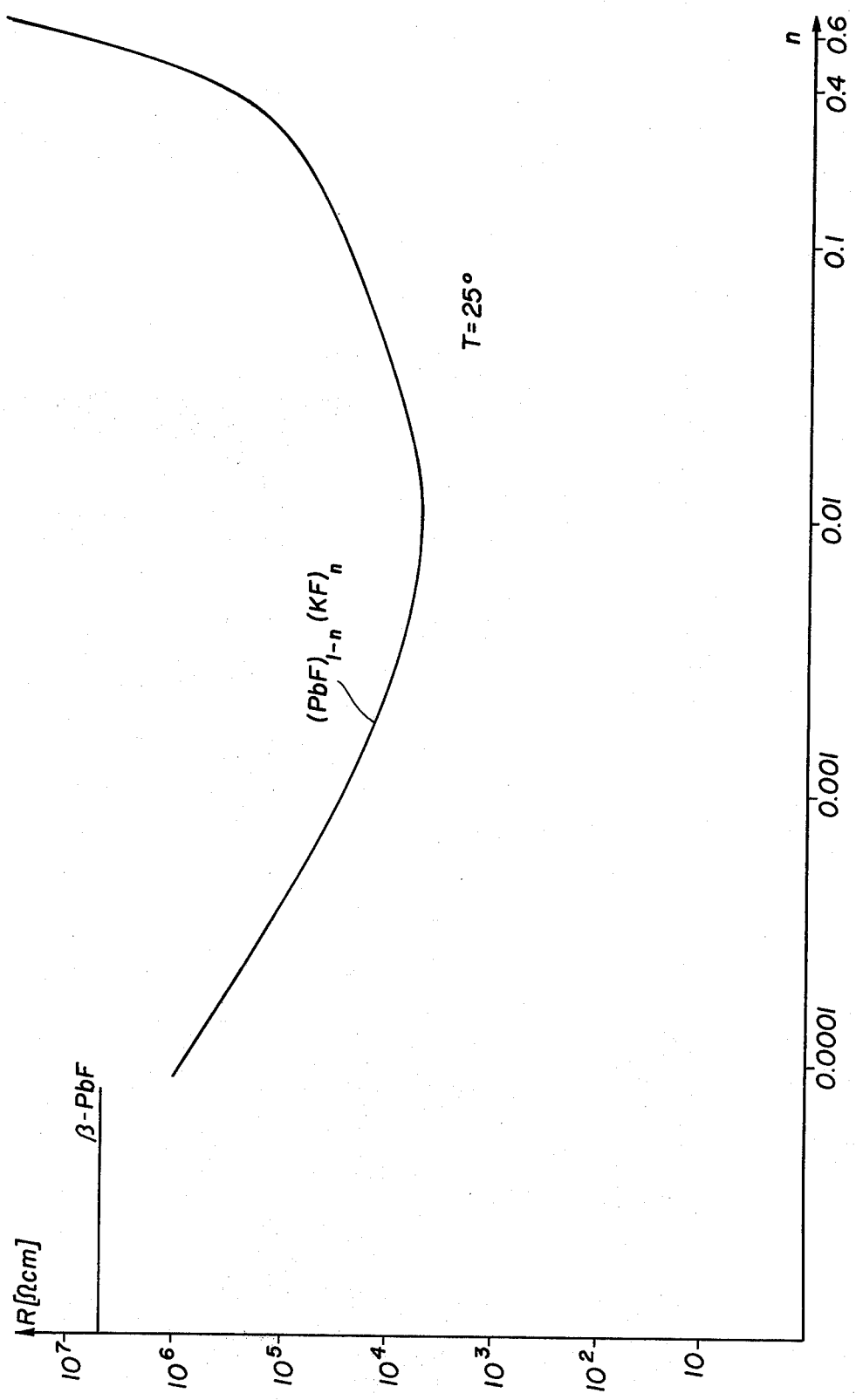
FIG. 3 is a plot diagram of the specific resistance of lead fluoride doped with potassium fluoride as a function of the dopant.

In FIG. 3, the specific resistance of lead fluoride doped with potassium fluoride as a function of the doping n at 25°C is shown. Surprisingly, in the range of n+0.01 to 0.1, the specific resistance is exceptionally low and is a minimum at n = 0.01. The specific resistance $\beta$-PbF$_2$ may be inferred from FIG. 3. Galvanic elements or cells with the solid electrolyte of the invention possess a good storage life and deliver the energy thereof at relatively low temperature. The solid electrolyte of the invention is utilizable essentially for primary cells, but can, however, also be used for accumulators, such as in the system lead/lead tetrafluoride, for example.

We claim:
1. A galvanic cell comprising positive and negative electrodes and a solid fluoride ion-conductive electrolyte having the formula $M_nPb_{1-n}F_{2-n}$ wherein M is at least one element selected from the group consisting of potassium and rubidium; Pb is selected from the group consisting of all lead and partly lead, partly metal more electropositive than lead; F is fluorine; and n is a positive value ranging from 0.001 to 0.6.
2. Galvanic cell according to claim 1 wherein the solid electrolyte is the compound

$(PbF_2)_{0.99}$

3. Galvanic cell according to claim 1 wherein the solid electrolyte is the compound $K_{0.25}Pb_{0.75}F_{1.75}$.

4. Galvanic cell according to claim 1 wherein said metal more electropositive than lead is zinc.
5. Galvanic cell according to claim 1 including a positive electrode formed of a heavy-metal fluoride.
6. Galvanic cell according to claim 1 including a positive electrode formed of $(CF)_x$.
7. Galvanic cell according to claim 1 including a negative electrode formed of earth-alkali metal.
8. Galvanic cell according to claim 1 including a negative electrode formed of heavy metal.
9. Galvanic cell according to claim 8 wherein the heavy metal is selected from at least one of the metals of the group consisting of zinc, lead and cadmium.

* * * * *